United States Patent [19]

Wallace

[11] 3,955,689

[45] May 11, 1976

[54] APPARATUS FOR ACCUMULATING STACKS OF SLICED MATERIAL

[75] Inventor: Gary Leonard Wallace, Oak Lawn, Ill.

[73] Assignee: Chemetron Corporation, Chicago, Ill.

[22] Filed: Mar. 25, 1974

[21] Appl. No.: 454,263

[52] U.S. Cl. .......... 214/6 H; 83/92

[51] Int. Cl.$^2$ .......... B26D 4/46; B65G 57/03

[58] Field of Search .......... 214/6 H, 6 DK; 83/73, 83/86, 92; 93/93 DP

[56] References Cited

UNITED STATES PATENTS

| | | | |
|---|---|---|---|
| 2,634,852 | 4/1953 | Clauss | 214/6 DK X |
| 2,819,661 | 1/1958 | Howdle et al. | 93/93 DP |
| 2,958,431 | 11/1960 | Curtenius | 214/6 DK |
| 3,318,351 | 5/1967 | Werder | 83/92 |
| 3,392,853 | 7/1968 | Mitchell et al. | 214/6 DK |
| 3,605,837 | 9/1971 | Lambert et al. | 83/73 |
| 3,667,520 | 6/1972 | Flesch | 83/73 |

*Primary Examiner*—Albert J. Makay
*Assistant Examiner*—L. J. Paperner
*Attorney, Agent, or Firm*—N. M. Esser

[57] ABSTRACT

Apparatus for making separate stacks of sliced material successively cut from a downwardly moving mass of material on a common cutting level comprises means for supportingly accumulating successive falling slices into stacks of a selected number of slices and discharging the stacks when the selected number of slices has been accumulated, said means includes a pair of support platforms or doors reciprocal toward and away from each other between a closed or accumulating position for supporting a stack as slices are accumulated and an open or discharge position wherein the platforms are spaced apart to discharge downwardly an accumulated stack therebetween. The platform structure is movable between an upper starting level spaced below the cutting level and a lower level wherein discharge of the accumulated stack occurs. The accumulating means also includes a system for moving the doors from the accumulating or closed position to the discharge or open position adjacent the lower level after a stack has been accumulated and for returning the platform structure to the upper level and closing the doors together for accumulating the next stack of slices without interruption of a steady stream of falling slices cut from a downwardly moving mass of material on the cutting level.

7 Claims, 12 Drawing Figures

FIG. 10
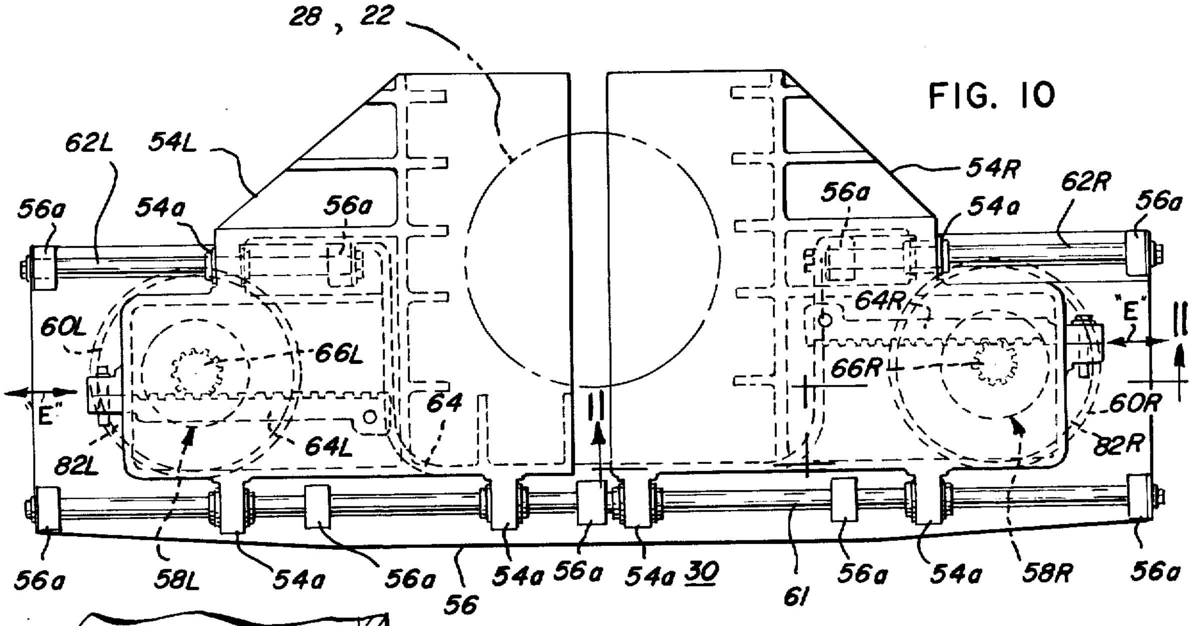
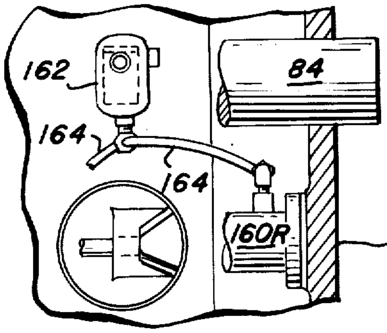
FIG. 5
FIG. 6
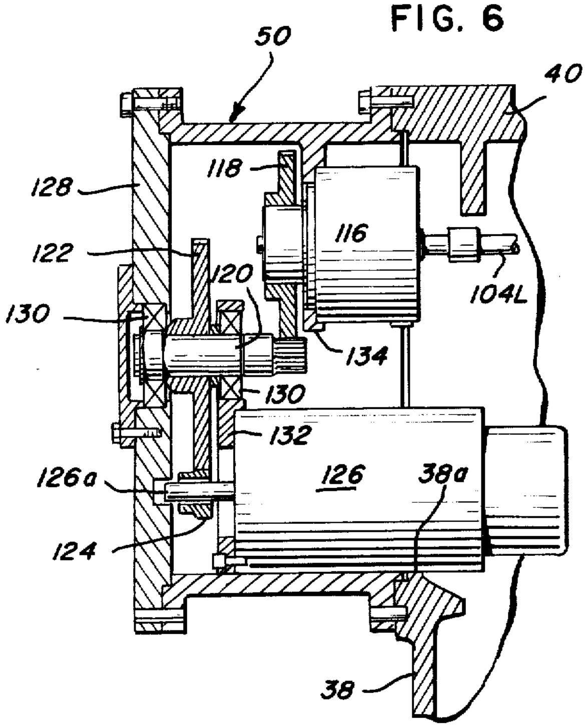
FIG. 11
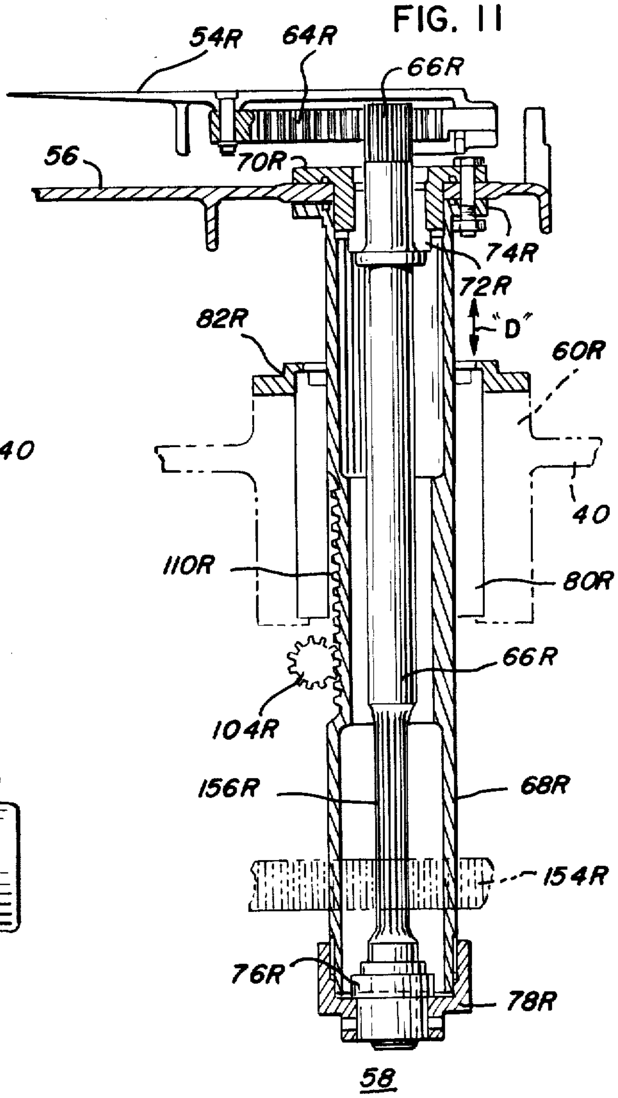

APPARATUS FOR ACCUMULATING STACKS OF SLICED MATERIAL

The present invention relates to a new and improved apparatus for accumulating stacks of sliced material sucessively cut from a mass of said material fed downwardly through a cutting plane or level. The present invention is an improvement on the apparatus shown and described in the copending U.S. patent application Ser. No. 293,144 filed Sept. 28, 1972 and assigned to the same assignee as the present application, now U.S. Pat. No. 3,821,913.

The apparatus of the present invention hereinafter called "stacking apparatus" or "stacker" is especially well adapted for use in a system for producing weight controlled stacks or groups of a counted number of slices cut from an elongated mass of material such as food products and the like, as shown in copending U.S. patent application Ser. No 293,669 filed Sept. 28, 1972 and assigned to the same assignee as the present application, now U.S. Pat. No. 3,820,420.

Many types of food product such as processed cheese, luncheon meat, bologna, salami and the like are initially produced in relatively large elongated loaves or masses four to six feet long and having generally uniform cross sectional shapes and dimensions throughout their length. These products are often marketed at retail outlets to the consuming public in small packages containing a selected number of relatively thin slices cut transversely from the large loaves initially produced. A system as shown and described in the foregoing copending U.S. patent application Ser. No. 293,669 is capable of producing stacks of a counted number of slices at extremely high speed rates and exceptionally close weight tolerances. The stacker apparatus of the present invention is especially well adapted to serve as a component in the system described.

It is an object of the present invention to provide a new and improved apparatus for producing separate stacks of a counted number of slices from a plurality of falling slices as they are cut from a downwardly moving mass of material on a common cutting level.

Another object of the present invention is to provide a new and improved stacker apparatus which is capable of producing separate stacks of a selected number of slices as in the preceding object without interrupting a somewhat continuous stream formed by separate downwardly falling slices of material cut in rapid succession on a common cutting level.

Another object of the present invention is to provide a new and improved stacker apparatus of the character described which is adapted to automatically operate in close synchronism with and responsive to the feeding speed of the mass of material into the apparatus which cuts the slices successively.

Another object of the present invention is to provide a new and improved stacker apparatus of the character described which is capable of operating at extremely high speeds and yet is still highly reliable and maintenance free in operation.

Another object of the present invention is to provide a new and improved stacker apparatus which is useful in combination with a high speed slicer for separating the slices into separate stacks of slices, each containing a selected number of slices.

Another object of the present invention is to provide a new and improved stacker apparatus of the character described where each successive slice falling downwardly from an upper cutting level travels a substantially constant distance to an accumulating stack even though the number of slices accumulating in the stack is continuously changing.

Another object of the present invention is to provide a new and improved stacker apparatus of the character described which is capable of rapidly discharging or releasing a stack of slices after accumulation of a selected number of slices in the stack and rapidly returning to begin accumulating slices for the next stack.

Another object of the present invention is to provide a new and improved stacker apparatus of the character described in the foregoing object wherein the discharge of a completed stack is accomplished so rapidly that there is no requirement for interruption in the flow of successive slices being cut and fed to the stacker.

Another object of the invention is to provide a new and improved stacker apparatus of the character described which does not require interruption or stoppage of the feeding of a mass of material into the cutting level during the interval required for discharge or release of a completed stack of slices and readying of the stacker for accumulation of the next stack of slices.

Another object of the invention is to provide a new and improved stacker of the character described which is selectively controllable to adjust for different, selected numbers of slices in a stack and adjustable to accommodate different rates of feed of material to the stacker. Another object of the present invention is to provide a new and improved stacker apparatus of the character described wherein the apparatus is operable to discharge or release each stack of slices in response to control signal from a counter.

Another object of the present invention is to provide a new and improved stacker apparatus of the character described wherein each stack is supported during an accumulation of slices therein on a downwardly traveling structure which is controlled to move at a selected rate related to the selected feed rate of the mass of material being sliced at the cutting level.

These and other objects, features and advantages of the present invention will be evident from the following description, taken with the aid of accompanying drawings of a preferred embodiment of the present invention. Briefly, in a preferred embodiment of a new and improved stacker apparatus in accordance with the present invention there is provided accumulating means for supportively accumulating successive falling slices into a stack of a selected number of slices and then discharging the stack when the selected number of slices has been counted. The accumulating means includes a pair of support platforms or doors reciprocal horizontally toward and away from each other between a closed, accumulating position, cooperatively supporting the slices as a stack is accumulated and an open, discharge position wherein the doors are spaced apart from each other to permit passage and downward discharge of a stack having a selected number of slices. A platform structure supporting the doors is reciprocally movable between an upper starting level spaced below a slice cutting level and a lower or discharge level. Means is provided for moving the platform and doors downwardly from the starting level while accumulating the slices to a lower level where discharge occurs and the downward travel is controlled at a selectively adjustable rate in response to a selected feed rate of the mass of material being sliced at the cutting level. Means is provided for moving the doors to open when the last slice of a stack is counted at the lower level in response to a control signal and thereafter return the platform and doors upwardly to the upper starting level. Closing of the doors in preparation to receive the next slices without interruption in the feed of slices from the cutting level above is accomplished after discharge of a stack occurs.

For a better understanding of the present invention reference should be had to the following detailed description taken in conjunction with the drawings, in which:

FIG. 5 is a fragmentary vertical sectional view taken substantially along lines 5—5 of FIG. 3;

FIG. 6 is a fragmentary vertical sectional view taken substantially along lines 6—6 of FIG. 2;

FIG. 10 is an enlarged top plan view of the platform and door assembly of the stacker apparatus constructed in accordance with the features of the present invention;

FIG. 11 is a fragmentary vertical sectional view taken substantially along line 11—11 of FIG. 10.

Figure 2:
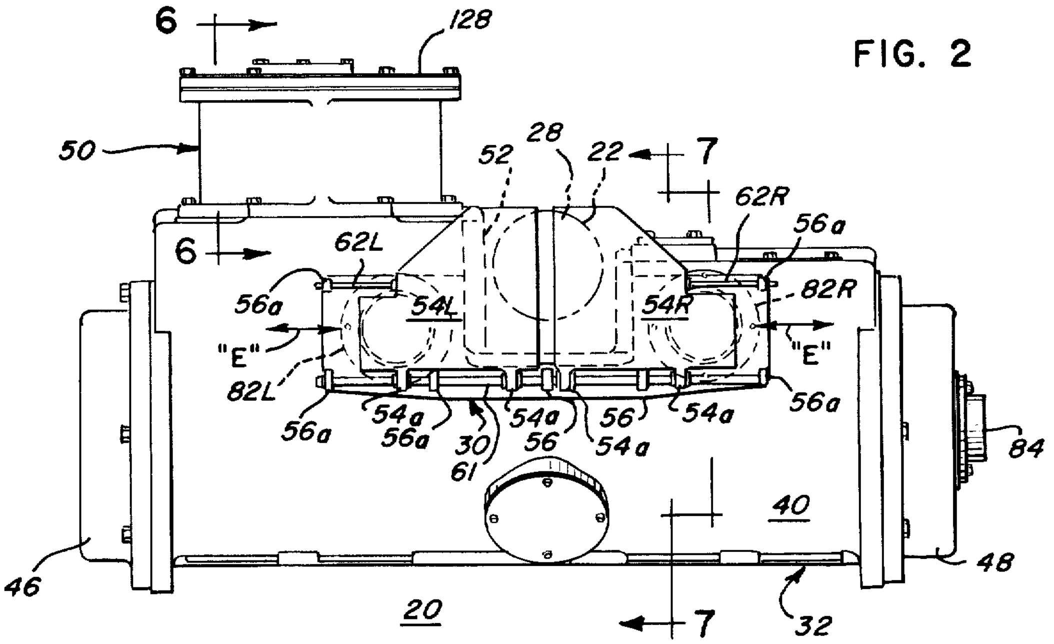
FIG. 2 is a top plan view of the apparatus of FIG. 1.

Referring now more particularly to the drawings, therein is illustrated a new and improved stacker referred to generally by the reference numeral 20 and especially adapted for use in conjunction with a system for producing weight controlled stacks of counted slices cut from elongated masses of material as disclosed and set forth in the copending U.S. patent application Ser. No. 293,669 filed Sept. 28, 1972 which application is incorporated herein by reference.

Figure 1:
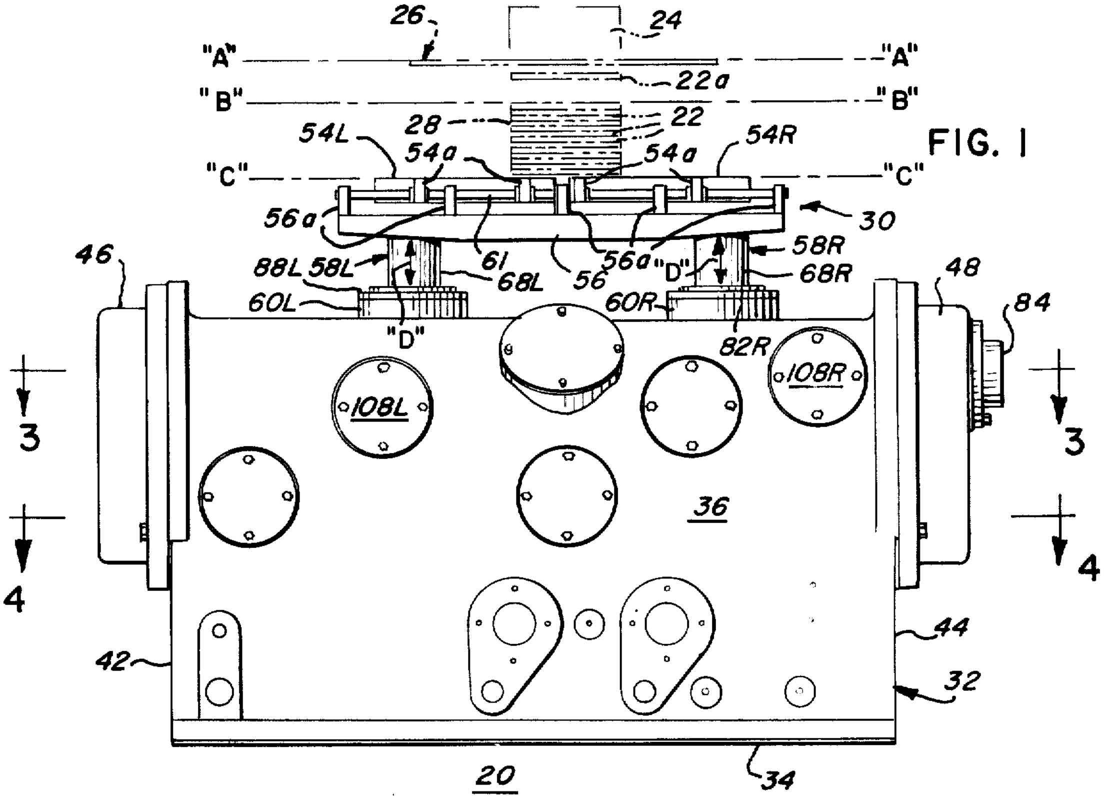
FIG. 1 is a front elevational view of an embodiment of a new and improved stacker apparatus constructed in accordance with the features of the present invention, the spacing between line A—A and line B—B being exaggerated for clarity.

As set forth in FIG. 1, the stacker 20 is adapted to receive and accumulate stacks of a selected number of slices 22 cut from an elongated mass of material 24 such as food products and the like fed downwardly through a cutting level or plane A—A representing the path of a rotary cutting knife 26. After each slice 22*a* is severed from the mass of material 24 along the cutting level by the rotary knife, the individual slice drops or falls downwardly toward the stacker (as shown by the arrow) and the stacker accumulates the slices into a stack 28. The growing stack is supported during the accumulation process on a platform and door assembly 30 and the successive slices 22*a* are added to the stack, the platform and door assembly moves downwardly so that each slice drops a relatively constant distance between the cutting level (line A—A) and an upper level (represented by line B—B). In order to best assure uniform placement of successive slices 22*a* in a stack, the cutting level (line A—A) and the upper level (line B—B) should be as close together as practicable, preferably, scarcely farther than the thickness of a slice plus the thickness of the knife 26, whereby each slice becomes supported from below by the platform and door assembly (or a preceding slice) before the cut is complete. The platform and door assembly 30 is moved downwardly from the upper level to a lower level (illustrated by the lines C—C) at a controlled rate and the accumulated stack of slices is then discharged. After discharge the platform and door assembly is returned rapidly upward to begin accumulation of the next stack of slices. Downward travel of the platform assembly 30 is synchronized and controlled in relation to the downward feed rate of the mass of material 24 moving into the cutting level and as set forth in the aforementioned copending patent application Ser. No. 293,669 this feed rate is established and controlled by a feeder apparatus as shown and described in more detail in another copending U.S. patent application Ser. No. 293,166 filed Sept. 28, 1972, which application is also incorporated herein by reference.

The downward travel of the platform and door assembly 30 is synchronized at a rate responsive to the downward feed rate of the mass of material 24 into the cutting level and this rate is controlled by the feeder apparatus. After the discharge of an accumulated stack of slices at the lower level, the platform and door assembly is rapidly returned upwardly on a return stroke to begin the next cycle and accumulation of another stack of slices.

The vertical distance or spacing between the cutting level and the upper level represents a substantially constant distance that each successive slice 22*a* falling onto an accumulating stack of slices must travel during the process and the vertical distance between the upper level and lower level (represents the upper and lower levels of the platform assembly 30) represents the downstroke distance equal to the height of a selected number of slices 22 in a completed stack 28. The distance between the upper and lower level is adjustable to accommodate different thicknesses of slices or selected different numbers of slices to be included in each stack. As set forth in the foregoing U.S. patent application Ser. No. 293,669, the number of slices in a stack is counted and at the end of the count a control signal is activated. This signal is used by the stacker 20 to initiate the discharge of an accumulated stack and subsequently the accumulation of slices for the next stack occurs without requiring a pause or interruption of the slicer operation.

In accordance with the present invention, the stacker 20 includes an enclosure or housing 32 having a base or bottom wall 34, an upstanding front wall 36, a back wall 38, a pair of left and right hand end walls 42 and 44 respectively, and a top wall or cover 40. As shown in FIGS. 1, 2, 3 and 4 the stacker housing 32 is provided with numerous access openings in the walls thereof and removable cover plates or doors are provided for these openings. The doors are removed when servicing the components contained in the interior of the housing. More particularly, the end walls 42 and 44 are provided with enlarged openings 42*a* and 44*a*, respectively, and these openings are provided with detachable cover members 46 and 48. The rear wall 38 is formed with an enlarged opening 38*a* and a removable box like subhousing 50 is attached to enclose the opening and provide a sealed enclosure for a clutch, motor and drive assembly for synchronously controlling the rate of downward travel of the platform and door assembly 30 as will be described.

Figure 3:
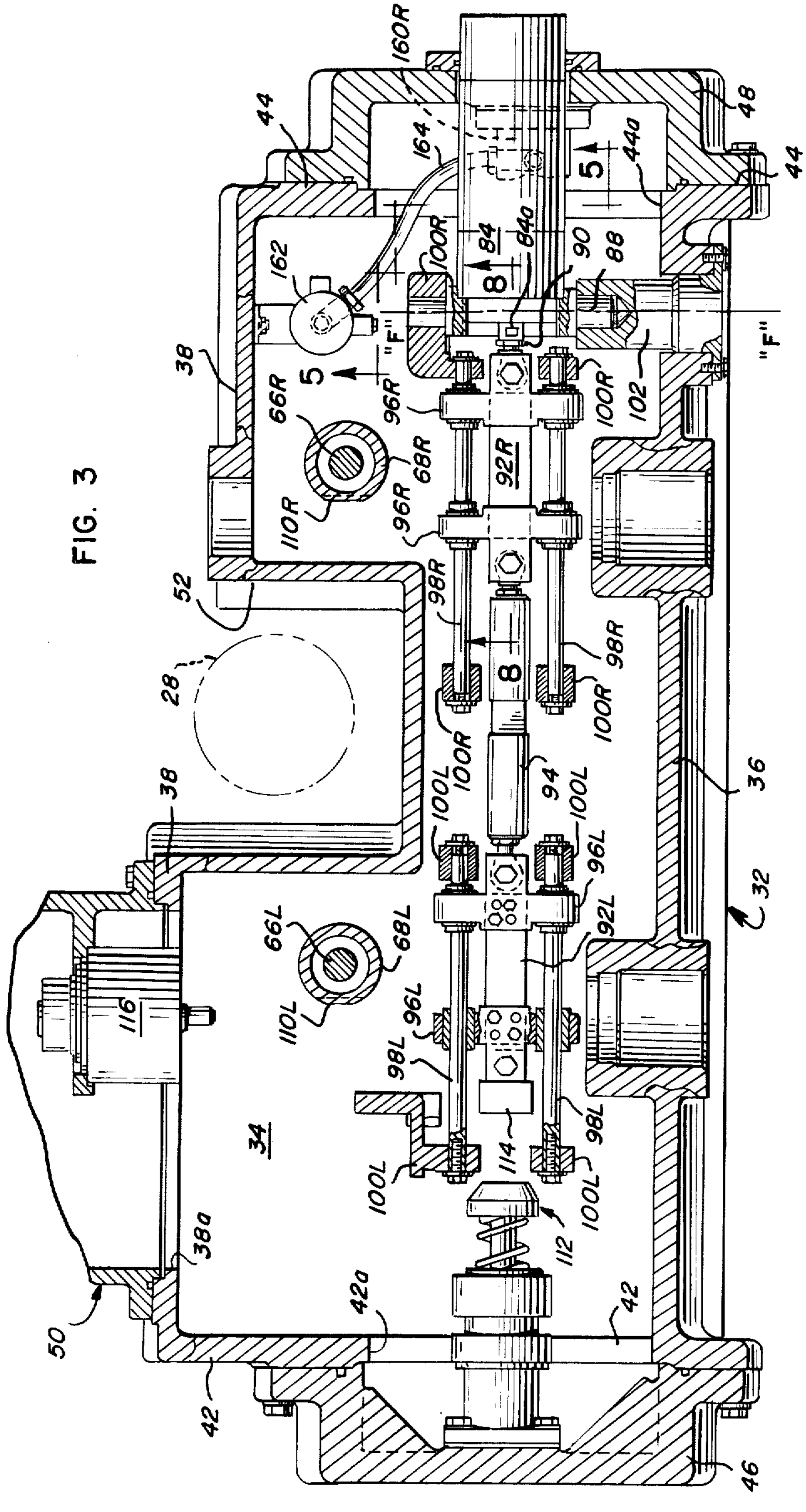
FIG. 3 is a horizontal sectional view taken substantially along lines 3—3 of FIG. 1.
Figure 4:
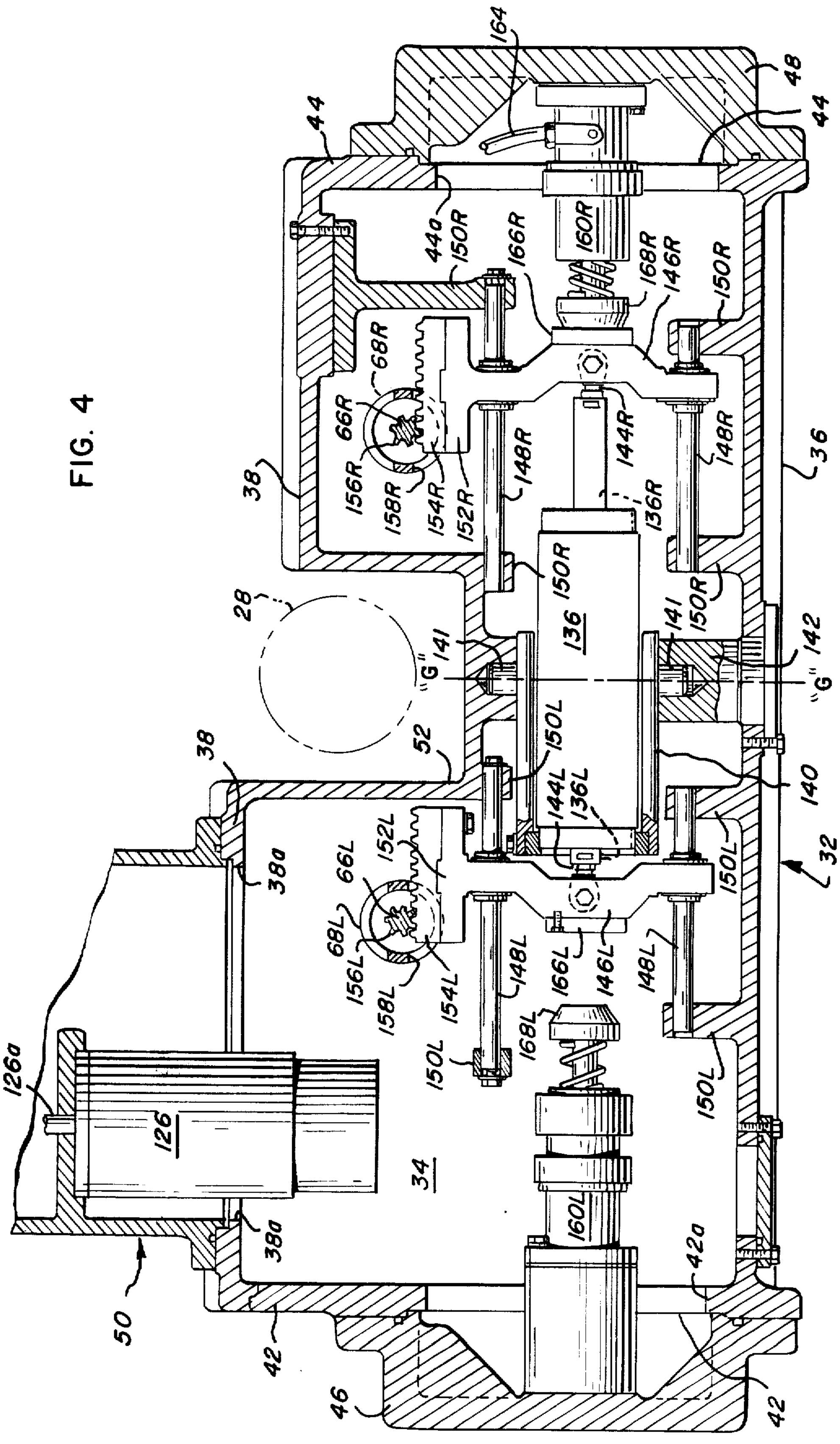
FIG. 4 is another horizontal cross sectional view taken at a lower level substantially conforming to lines 4—4 of FIG. 1.

As best illustrated in FIGS. 2, 3 and 4 the rear wall 38 of the stacker housing 32 is formed with vertically extending indentation or passage for accommodating the downward travel of the finish stacks 28 as they are released or discharged from the platform and door assembly 30. Once the platform and door assembly is activated to release or discharge a stack, the stack falls downwardly by gravity through the passage 52 in the rear wall of the housing and eventually comes to rest on a scale platform (not shown) where weighing of the stack is accomplished as set forth in the aforementioned copening U.S. patent application Ser. No. 293,669.

Referring to FIGS. 1, 10 and 11, the platform and door assembly 30 includes a pair of shutter-like platform doors 54L and 54R respectively mounted for reciprocal horizontal sliding movement toward and away from one another and support from a unitary underlying platform structure 56. The platform structure 56 in turn is supported on opposite sides of the passageway 52 of the housing 32 by a pair of vertically extending support post assemblies 58L and 58R, respectively, which post assemblies extend downwardly into the interior of the stacker housing 32 through enlarged flanged cylindrical openings 60L and 60R, respectively, integrally formed in the top wall 40.

As best shown in FIG. 10 the platform doors 54L and 54R are movable between a closed or stack accumulating position as shown, wherein the oppositely facing inside edges of the doors are closely adjacent one another to provide cooperative support for the slices being accumulated on a downward stroke of the platform assembly. The doors are movable rapidly outwardly in opposite horizontal directions from the closed position to an open or discharge position wherein a stack of slices on the doors will drop downwardly into the passageway 52. In the open position when the platform doors 54L and 54R are at the lower level, the spacing between the inside opposite edges of the respective doors is sufficiently great to permit ample clearance to freely pass the stack of accumulated slices 22 and outward opening of the doors is rapid so that the inertia of the stack maintains it in a centered position as support is withdrawn. After the upper slice 54R, in a discharged stack is relatively below the level of the doors 54L and because the doors have been elevated sufficiently as the stack has begun to fall, the doors are moved rapidly inwardly into the closed or accumulating position. In order to reduce the time that the doors are open, the platform and door assembly begins moving upwardly immediately after the doors are open and the doors are closed as soon as possible after clearing the stack. The doors 54L and 54R are supported for reciprocal movement on the platform structure 56 and a plurality of upstanding lugs or brackets 56*a* on the upper surface of the structure as best shown in FIGS. 1 and 10. Five of the upstanding lugs 56*a* are positioned along the front edge of the platform structure and a front guide rod 61 extends through bores or apertures formed in the lugs to guide and support the forward edges of the platform doors. A pair of shorter, rear guide rods 62L and 62R are carried by similar upstanding lugs 56*a* positioned along the rearward edge of the platform structure 56. Both the platform doors 54L and 54R and the unitary platform structure 56 are formed with integral stiffening ribs on the underside thereof to provide sufficient structural integrety.

Each of the platform doors is provided with a pair of integrally formed forwardly extending lugs 54*a* slidably disposed on the front guide rod 61 and a single lug 54*a* is provided to slide on the rear guide rods 62L and 62R, which rods are parallel with the forward guide rod 61. The unitary support structure 56 is shaped with an enlarged passageway 64 at the center thereof aligned with the passageway 52 in the stacker housing so as not to interfere with a discharged stack 28 when the doors 54L and 54R are opened.

On the underside of each platform door there is provided an elongated rack 64L, 64R having teeth along one side and adapted to engage the teeth or splines on the upper end portion of a pair of central shafts 66L and 66R respectively, of a pair of support post assemblies 58L and 58R which carries the platform structure 56. As viewed in FIG. 10, the rack 64L on platform door 54L is on the front side of the shaft 66L and the rack 64R on the right hand platform door 54R is on the rear side of the shaft 66R so that when the shafts are rotated in the same direction, movement of the respective racks 64L and 64R engaged thereby will be in opposite directions to open or close the platform doors depending upon the direction of rotation of the shafts.

The racks 64L and 64R are attached to the underside of the respective platform doors by suitable fastening means as best shown in FIG. 11. As shown in FIGS. 4 and 10, clockwise rotation of the shafts 66L and 66R drives the platform doors 54L and 54R from the closed position as shown to the open position for discharging a stack of slices and rotation of the shafts in a counterclockwise direction causes the doors to close or return to the closed position.

The support post assemblies 58L and 58R include elongated, cylindrical outer shells or housings 68L and 68R, respectively, in concentric relation with the central shafts carried therein. Referring to FIG. 11 which is typical of both the left and the right hand support post assemblies, the central shaft 66R is supported for rotative movement within the outer shell 68R at the upper end by a flanged bearing assembly 70R which includes a downwardly depending cylindrical bearing cage which extends through an opening in the support structure 56 into the inside diameter of the outer shell. A roller bearing 72R is provided to support the upper end portion of the shaft 66R for rotation in the shell. The shell 68R is formed with a radial flange 74R adjacent the upper end, and the radial flange of the roller bearing 72R, and the flange 74R are sandwiched on opposite sides of the platform structure 56 to secure the platform to the upper end of the support post shell 68R. The upper end of the left hand support post shell 68L is connected to the support platform structure 56 in a similar manner.

The support post assemblies 58L and 58R are mounted for reciprocal vertical movement in the respective sleeves 60L and 60R formed in the upper wall 40 of the stacker housing 32. The lower ends of the central shafts 66L and 66R are supported for rotation within the outer shells 68L and 68R, respectively, by means of bearing members 76L and 76R supported with cap assemblies 78L and 78R and the central shafts are freely rotatable within the respective shells which do not rotate. The shells 68L and 68R are mounted for reciprocal vertical movement in the bushings or sleeves 60L and 60R and bearings 80L and 80R with key slots therein are provided to permit vertical sliding movement of the support posts while preventing rotation thereof. The upper end of the sleeves 60L and 60R are sealed around the shells 68L and 68R by annular sealing assemblies 82L and 82R respectively.

Figure 7:
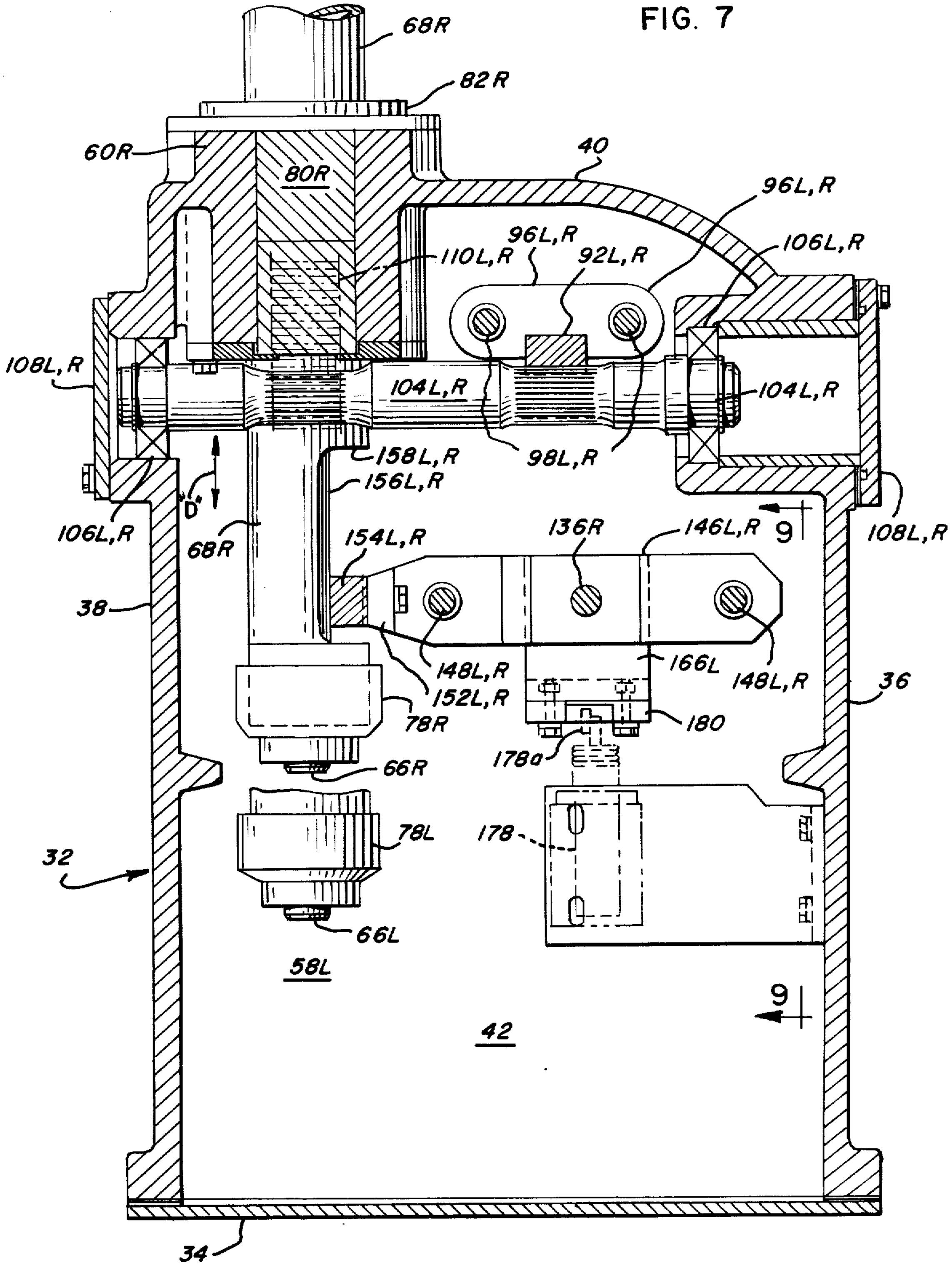
FIG. 7 is a vertical transverse sectional view taken substantially along lines 7—7 of FIG. 2.

It will be seen from the foregoing that the outer shells 68L and 68R of the respective support post assemblies are vertically movable relative to the stacker housing 32 to raise and lower the platform doors 54L and 54R as indicated by the vertical arrows D of FIGS. 1, 7 and 11. The platform doors in turn are slidably mounted on the unitary platform structure 56 for horizontal sliding movement toward and away from one another between the closed and open positions as indicated by the arrows E (FIGS. 2 and 10).

Figure 12:
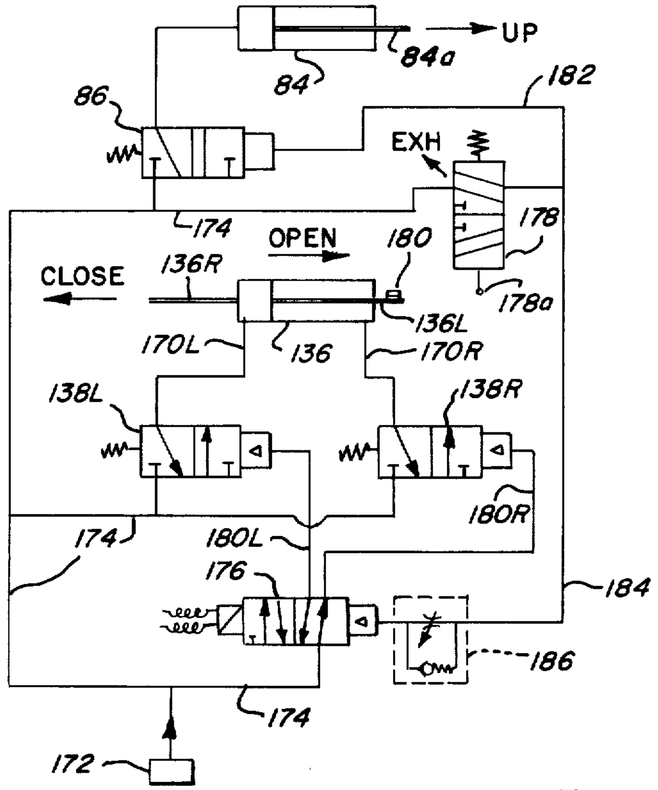
FIG. 12 is a schematic diagram of a pneumatic system for controlling the operation of the stacker apparatus in accordance with the features of the present invention.

Referring now more particularly to FIGS. 3, 7 and 11, the stacker apparatus 20 includes a drive system for moving the platform 56 on a return stroke upwardly to the upper level and the drive system includes a single acting penumatic lift cylinder 84 controlled by a three-way pneumatically actuated spring return valve 86 (FIG. 12). The cylinder includes a piston rod **84*a* extending outwardly of the forward or inward end of the cylinder and the cylinder body is supported from the forward end on a gimbel structure 88 to permit angular adjustments of the longitudinal axis of the cylinder. The outer end portion of the cylinder extends outwardly through an appropriate opening in the right hand housing end cover 48. The gimbel structure 88 supports the rod end of the cylinder and permits pivotal movement of the cylinder body a transverse axis (labeled F—F in FIG. 3). The outer end of the piston rod 84*a* is interconnected by means of a clevis assembly 90 to right hand end of a right hand rack member 92R. The left hand end of the rack member 92R is interconnected by means of an elongated linking element 94 and coupling assemblies to the right hand end of a left hand rack member 92L. Pivotal connections are provided between the racks, interconnecting link 94, and piston rod 94*a* of the lift cylinder 84 so that the toothed racks move in precise coaxial alignment when the lift cylinder is actuated by the introduction of pressurized air into the outer end to extend the piston rod. The rack 92L is guided for reciprocal horizontal movement by means of a pair of spaced apart yokes 96R extending transversely thereof and supported for sliding movement on a pair of parallel horizontal guide rods 98R spaced on opposite sides of the rack and supported at opposite ends by integral projections or support lugs 100R formed on the inside wall surfaces of the stacker housing 32. The right rearward lug 100R also provides support for one end of the gimbal support 88 of the lift cylinder 84. The opposite side of the gimbal is supported in a removable plug assembly 102 which extends into a capped opening formed in the front wall 36 of the stacker housing as best shown in FIG. 3. The racks 92L and 92R** are provided with teeth along the underside and are adjustably secured to their respective transverse yokes in order to permit precise alignment with one another for a smoothly functioning longitudinally reciprocal linkage train.

Figure 8:
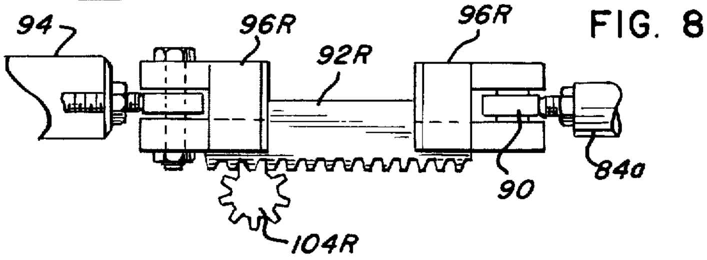
FIG. 8 is a fragmentary, vertical sectional view taken substantially along line 8—8 of FIG. 3.

FIG. 8 illustrates the interconnection between the piston rod 84, clevis 90, right hand rack 92R, link element 94 and supporting yokes 96R and in this figure it is seen that the teeth on the underside of the rack engage splines or teeth formed adjacent the forward or front end portion of a transversely extending drive shaft 104R as best shown in FIGS. 7 and 8.

Referring to FIG. 7, opposite ends of the drive shaft 104R (also a left hand shaft 104L which is similar thereto) are supported in removable bearing assemblies 106R (106L) seated in apertures or openings provided in the front and rear walls 36 and 38 of the stacker housing 32. Suitable caps or covers 108R (108L) are provided to seal the apertures on the walls of the housing and permit access upon removal to the shafts and internal mechanism of the drive system. Each of the transverse drive shafts 104L and 104R is provided with a splined or toothed section spaced rearwardly of the splined section which is engaging the racks 92L and 92R, respectively and these second splined sections on the shafts drivingly engage, rack sections of teeth 110L and 110R, respectively, (FIGS. 3 and 11) formed on the outer shells 68L and 68R of the respective support post assemblies 58L and 58R.

Referring to FIG. 11, as the transverse shafts 104L and 104R rotate in a clockwise direction the support post assemblies are driven downwardly and when rotation of the shafts is in an opposite direction the support post assemblies are driven upwardly. As viewed in FIG. 3, when the piston rod **84*a* is retracted, the platform door assembly 30 is in a lower level position. When the valve 86 is activated to admit pressurized fluid to the outer end of the cylinder 84, the racks 92L and 92R are driven from the position of FIG. 3 toward the left causing the transverse shafts 104L and 104R to rotate in a counterclockwise direction as shown in FIG. 11. This causes the support post assemblies 58L and 58R to be driven upwardly and elevate the platform and door assembly 30 to the upper level indicated by the line B—B of FIG. 1. Movement of the racks from left to right permits the assembly 30 to move downwardly. Because the lifting or elevation of the support post assemblies from the lower level to the upper level must be rapid in order to provide continuous stacking operation without interruption of the flow of slices 22 dropping onto the stacker after being sliced at the cutting level, the acceleration forces involved in the drive train are relatively high and for this reason a shock absorber 112, FIG. 3, carried by the left hand end cover 46 is adapted to arrest the leftward travel of the rack 92L and the other drive train elements longitudinally connected therewith. A bumper 114 is provided on the left hand end of the rack 92L for engagement with a head portion on the shock absorber 112.**

Once the platform and door assembly 30 reaches the upper level (as indicated by the line B—B in FIG. 1) the valve 86 is operated to depressurize the outer end of the lift cylinder 84 and the cylinder thus offers minimal resistance to ensuing the downward travel of the platform and door assembly as a selected number of slices 22 are being accumulated in a stack 28. Referring briefly to FIG. 12, the valve 86 is shown in a normal spring return position and the outer end of the lift cylinder 84 being exhausted to atmosphere.

Downward travel of the platform and door assembly 30 is controlled and synchronized with the downward feed rate of the mass of material 24 into the cutting level. As the platform and door assembly move on a downward or accumulation stroke, the racks 92L and 92R move from left to right (FIG. 3) and the piston rod

84*d* is forced back into the body of the lift cylinder which now acts as a dampening unit. The lift cylinder 84 provides the initiating force for elevating the platform and door assembly 30 rapidly upwardly from the lower level to the upper level and downward travel of the platform and door assembly during the accumulation phase at a much slower rate and is selectively controlled in synchronism with feed rate of the mass of material 24 moving into the cutting path of the knife 26.

The transverse drive shaft 104L (FIG. 6) is coupled at its rearward end with a one way clutch 116 mounted in the rear housing section 50 as best shown in FIGS. 3 and 6. During elevation of the platform door assembly 30 by the cylinder 84, the clutch 116 is disengaged. After the platform and door assembly reaches the upper level, the clutch is engaged to interconnect the shaft 104L through a gear train comprising a gear 118, a splined shaft 120, a gear 122 carried on the shaft, and a gear 124 mounted on the rotor shaft 126*a* of a direct current, synchronous motor 126. The clutch 116, gear train and synchronous motor 126 are mounted in the rear housing section 50 having a removable back plate 128. Bearings 130 are provided for supporting the splined shaft 120 and an inner bearing is mounted in an opening in an internal wall 132 which also supports the rearwardly facing end of the synchronous motor 126. The rearwardly facing end of the slip clutch 116 is supported in a circular recess formed in another internal wall 134 formed in the housing section 50 and the entire clutch, gear train and motor assembly can be removed from the back side of the stacker housing wall 38 with all of the components in tact for easy service.

The synchronous motor 126 is electrically interconnected with the feed motor of the feed apparatus which moves the material 24 into the cutting path of the knife, and the rate of descent of the platform and door assembly 30 is thus synchronized and responsive to the rate of feed of the mass of material 24 into the cutting path of the slicer. Should the platform and door assembly tend to descend too rapidly, the synchronous motor 126 via the gear train and clutch 116 tends to retard the rotation of the shaft 104L and thereby control the descent of the support post assemblies 58L and 58R to the desired selected rate. On the other hand, if the platform and door assembly 30 tends to descend at too slowly during the accumulation phase, the synchronous drive motor 126 then provides positive torque to the shaft 104L to drive the platform and door assembly 30 downwardly at a faster rate until the desired rate is attained. The speed of downward travel as controlled by the synchronous motor 126 is adjustable and is normally set to be equal to or a fixed percentage of the feed rate of the mass of material 24 into the cutting path. In this manner the falling distance of each successive slice 22*a* as it is cut from the mass 24 is substantially the same during the accumulation of a stack of a counter number of slices. The platform and door assembly 30 descends at a rate selected to produce a drop in level of the thickness of each slice as each successive slice is cut.

From the foregoing it will be seen that the upward movement of the platform door assembly is rapid and is initiated by the pneumatic cylinder 84 while downward travel of the platform door assembly during the accumulation of slices into a stack is much slower and is controlled in response to the feed rate of material moving into the cutting path of the knife 26 above the stacker apparatus 20. At the end of a downward stroke of the platform and door assembly 30, the clutch 116 is disengaged and this breaks the driving connection between the shaft 104L and the synchronous motor 126 so that pneumatic cylinder 84 is then able to rapidly lift the platform and door assembly upwardly as previously described on a rapid return stroke.

The stacker apparatus 20 also includes an actuation system for opening and closing the platform doors 54L and 54R in phase or synchronism with the vertical position or level of the platform door assemblies 30. The system is best illustrated in FIGS. 4, 5, 7, 9 and 12 and includes a double acting, pneumatic cylinder 136 having a piston rod with opposite end sections 136L and 136R projecting outwardly from the respective cylinder ends. Fluid flow into and out of the left hand end of the cylinder 136 is controlled by a pneumatically actuated, spring return three way valve 138L and fluid flow into and out of the right hand end of the cylinder is controlled by a similar three way valve 138R as indicated schematically in FIG. 12. The cylinder is supported in the housing 32 for pivotal movement about a transverse axis (represented by the lines G—G in FIG. 4) extending across the body of the cylinder about midway between opposite ends. For this purpose a gimbel structure 140 of U-shaped configuration is provided and includes a pair of stub axles 141 which are pivotally supported in the housing rear wall 38 and a removable plug member 142 in the front wall 36. The right hand piston rod extension 136R is pivotally connected by a clevis 144R to a reciprocally movable, transverse yoke 146R which is supported for sliding movement on a pair of guide rods 148R parallel and disposed on opposite sides of the piston rod. Opposite ends of the guide rods 148R are supported in lugs or brackets 150R integrally formed on the inside wall surfaces of the stacker housing 32 as best shown in FIG. 4. A similar setup is provided for the left hand rod section 136L. When the left hand end of the cylinder 136 is filled with pressurized fluid by activation of the valve 138L, the right hand rod section 136R is extended outwardly as shown in FIG. 4 driving the shafts 66L and 66R in a counterclockwise direction until the yokes 146L and 146R are in the right hand position as indicated. When fluid is then supplied to the right hand end of the cylinder through the valve 138R the piston is moved towards the left and the yokes 146L and 146R are moved to the left rotating the shafts 66L and 66R in a clockwise direction to open the platform doors 54L and 54R as previously described. The yokes are formed with enlarged brackets 152L and 152R respectively on the rearward ends and these brackets provide support for racks 154L and 154R respectively which engage intermediate splined sections 156L and 156R provided on the central shafts 66l and 66R of the support post assemblies. The intermediate, splined sections on the shafts are accessible for contact by the racks 154L and 154R (as shown in FIG. 4) because enlarged cutouts or access openings 158L and 158R are formed in the outer shells 68L and 68R of the support post assemblies. The splined sections 156L and 156R and the access openings 158L and 158R are considerably longer than the vertical dimension of the engaging racks 154L and 154R so that engagement is continuous even though the support post assemblies 58L and 58R reciprocate vertically between the upper and lower levels as previously described.

Movement of the racks 154L and 154R from the right hand position of FIG. 4 to the left causes the doors 54L and 54R to open for discharging an accumulated stack 28 of slices. Rightward travel of the racks results in returning of the doors to the closed or accumulating position as shown in FIGS. 2 and 10.

Figure 9:
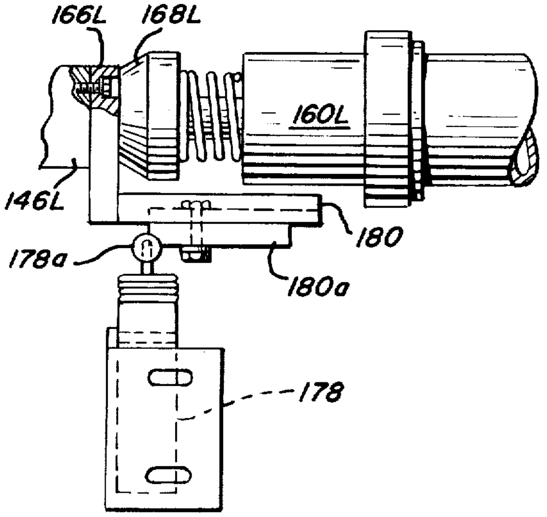
FIG. 9 is a fragmentary vertical sectional view taken substantially along lines 9—9 of FIG. 7.

Because the opening and closing of the doors must be extremely rapid in order to avoid interruption of the normal flow of successively cut slices **22*a* falling downwardly from the cutting level onto the stacker, the drive system is equipped to handle relatively high shock loads resulting from the rapid acceleration and deceleration when the piston rod of the cylinder 136 reaches the end of a stroke in either direction. For this purpose a pair of shock absorbers 160L and 160R are aligned with the axis of the cylinder 136 at opposite ends of the housing 32 and these units are supported on the left and right hand end cover members 46 and 48 as shown in FIG. 4. As illustrated in the sketch of FIG. 5, the shock absorbers 160R are of the adjustable pneumatic/hydraulic type so that the rate of snubbing action upon engagement of the yokes 146L and 146R can be adjusted to provide the precise amount of travel required. For this purpose an adjustable air-oil reservoir 162 is provided and the reservoir is connected to the shock absorbers 160L and 160R by fluid lines 164 so that the snubbing action of the absorbers may be adjusted in accordance with the air-charge pressure in the reservoir. The yokes 146L and 146R are provided with engagement plates 166L and 166R for contact with the frustroconical head sections 168L and 168R of the respective shock absorbers as shown in FIGS. 4 and 9.**

Referring now to the schematic diagram of FIG. 12 the actuating lift cylinder 84 and the door opening and closing cylinder 136 are shown schematically in a position as they would be when the doors 54L and 54R are closed for accumulating a stack 28 with platform door assembly 30 on a downward stroke toward the lower level indicated by the lines C–C in FIG. 1. In this condition the piston in the door control cylinder 136 is as shown in FIG. 4 with compressed air being supplied to the left hand end of the cylinder via a door open line 170r connected to the valve 138R. Referring to FIG. 12, compressed air is supplied from a suitable source 172 via a supply conduit 174 through a four way, electropneumatic, control valve 176. From the valve 176 pressurized air is supplied via conduits 180L or 180R to the pneumatic actuators of the respective valves 138l and 138R. When no pressure is being supplied to the actuators of the valves 138L and 138R, the valves are spring returned to the positions diagrammatically shown in FIG. 12. When either valve 138l and 138R is actuated by pressurized fluid from one of the lines 180L or 180R the piston in the cylinder 136 is moved towards the left or right as the case may be and the fluid on the opposite side of the piston is exhausted to the atmosphere as the movement proceeds. Compressed air from the source 172 is also supplied via the supply line 174 to an inlet port of the valves 138L and 138R as shown and this compressed air flows into either end of the cylinder 136 depending upon which the valves 138L or 138R is being actuated.

The conduit 174 supplies compressed air or actuation of the cylinder 84 via the inlet port of the valve 86 which is shown in a normal spring return position as when the pneumatic actuator is inactive. Operation of the valve 86 is controlled by a mechanically activated limit valve 178 of the spring return type, and this valve is shown in a normal or unactuated position. When the piston rod 136L is extended fully to the left (FIG. 4) upon opening of the doors, a valve actuating member 180 (FIGS. 7 and 9) carried by the cushion plate 166L on the yoke 146L (FIG. 9) engages the operator **178*a* of the limit valve 178 and this activates the valve to supply pressurized fluid from the supply line 174 to a line 182 connected to the pneumatic actuator of the lift cylinder control valve 86. When the valve 86 is actuated, pressurized fluid is supplied to the outer end of the single acting lift cylinder 84 causing the platform and door assembly 30 to rapidly rise from the lower level toward the upper level as previously described. When the actuator 180 engages the operator 178*a* of the limit valve 178, pressurized fluid is also supplied via a line 184 connected to the pneumatic actuator side of the electro-pneumatic control valve 176. When the valve 176 is actuated pneumatically by pressure supplied through the line 184, pressurized fluid is supplied via the line 180R to the pneumatic actuator of the valve 138R and this directs supplying air into the left hand end of the cylinder 136 moving the doors toward the closed position. In order to prevent the doors 54L and 54R from closing immediately as the platform and door assembly 30 moves upwardly on a return stroke, a throttling and check valve assembly 186 is provided in the line 184 to provide a time delay between initiation of an upstroke and the closing of the doors 54L and 54R. This time delay is adjusted to insure that the stack is fully cleared below the level of the doors 54L and 54R** before the doors are closed so that engagement of the doors with upper slices in the downwardly falling stack does not occur.

Initial opening of the doors to discharge at the lower level is achieved by utilizing an electrical impulse from the associated slicer system. This electrical pulse energizes an electromagnetic actuator coil of the valve 176 at the instant when the last slice of a stack has been counted in accordance with the selected number of slices the the stack. When the coil is energized, the valve 176 directs fluid from the line 174 via line 180L to the valve 138L. When the valve 138L is activated the doors 54L and 54R are opened to discharge a stack by movement of the piston rod in the cylinder 136 toward the left as shown in FIG. 4. The doors remain in the open position during the time delay interval as previously described and after the delay, the valve 176 again shifts back toward the left supplying pressurized fluid to the left hand side of the piston.

From the foregoing it will be seen that the downward travel of the platform door assembly 30 is selectively adjusted and controlled and is synchronized by means of the synchronous motor 126 to accommodate the feed speed of the material 24 into the cutting path of the knife. When the last slice to be included in a stack is counted an electrical impulse is produced and utilized to activate the valve 176 to open the doors 54L and R and discharge an accumulated stack. As the doors open, the platform and door assembly 30 is rapidly returned upwardly and the doors are maintained open for a short time delay period.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for making separate stacks of an adjustable selected number of thin flat slices of flexible material from a stream thereof comprising a succession of downwardly falling slices cut in sequence on a common cutting level from a mass of said material fed downwardly through said cutting level at an adjustable selected feed rate, said apparatus comprising a base, means for supportively accumulating successive falling slices into a stack of a selected number of slices and discharging said stack when said selected number of slices has been accumulated, said means including a pair of platform doors supported for simultaneous coplanar reciprocal movement toward and away from each other between a coplanar closed, accumulating position adjacent each other cooperatively supporting an accumulating stack of said slices and a coplanar open discharge position spaced apart from each other sufficient to pass and discharge a completed stack of slices between said doors, said apparatus including means supporting said doors for vertical reciprocal movement relative to said base between an upper level spaced below said cutting level and a selctively adjustable lower level spaced therefrom, said supporting means including a platform structure supporting said doors for reciprocal horizontal movement thereon to open and close and a vertical post assembly carrying said platform structure for vertical movement relative to said cutting level, said support post assembly including post means mounted for vertical reciprocaal movement on said base and said door moving means including shaft means supported for rotation from said post, said post comprising a hollow housing with said shaft means supported for rotation inside said housing in concentric relation therewith, means for simultaneously moving said doors in coplanar relation from said closed position to said open position adjacent said lower level, and for simultaneously moving said doors in coplanar relation from said open position to said closed position when said doors are returned toward said upper level, and means for moving said door supporting means downwardly from said upper level at a selected rate responsive to said selected feed rate and for returning the same upwardly from said lower level to said upper level.

2. The apparatus of claim 1 wherein said housing and said shaft means are provided with teeth means thereon, said door moving means including a rack drivingly engaging said teeth means of said shaft means for rotating the same within said housing to open and close said doors, said means for moving said door supporting means including drive shaft means engaging said teeth means of said housing for reciprocating the same.

3. The apparatus of claim 2 wherein said door moving means includes fluid cylinder means for reciprocally moving said rack to open and close said doors.

4. The apparatus of claim 3 including electromagnetically operated valve means for activating said fluid cylinder means for opening and closing said doors, said valve means operable upon receiving an electromagnetic impulse to move said rack to open said door.

5. The apparatus of claim 4 wherein said valve means includes a fluid actuated operator for activating said fluid cylinder to close said doors.

6. The apparatus of claim 5 including a second fluid cylinder, second rack means engaging said drive shaft means for elevating said housing and connected to said second fluid cylinder.

7. The apparatus of claim 6 including a synchronous motor selectively engageable with said drive shaft means for controlling the rate of descent of said door supporting means.

* * * * *